(12) United States Patent
Page

(10) Patent No.: US 7,928,604 B2
(45) Date of Patent: Apr. 19, 2011

(54) UNIVERSAL SYSTEM FOR CONTROLLING AUTOMATED TRANSFER SWITCHES IN RESPONSE TO EXTERNAL STIMULI

(75) Inventor: J. Dennis Page, Guyton, GA (US)

(73) Assignee: The Storm Shelter Corporation, Savannah, GA (US)

( * ) Notice: Subject to any disclaimer, the term of this patent is extended or adjusted under 35 U.S.C. 154(b) by 0 days.

(21) Appl. No.: 12/244,434

(22) Filed: Oct. 2, 2008

(65) Prior Publication Data

US 2009/0091193 A1      Apr. 9, 2009

Related U.S. Application Data

(60) Provisional application No. 60/997,535, filed on Oct. 4, 2007.

(51) Int. Cl.
 *H02J 1/00*      (2006.01)
 *H02J 3/00*      (2006.01)
(52) U.S. Cl. ............ 307/80; 307/64; 307/85; 307/86; 361/115
(58) Field of Classification Search .......... 307/80
 See application file for complete search history.

(56) References Cited

U.S. PATENT DOCUMENTS

| | | | |
|---|---|---|---|
| 1,859,125 A | 1/1930 | Bethenod | |
| 3,891,919 A | 6/1975 | Penninger | |
| 3,970,898 A | 7/1976 | Baumann et al. | |
| 4,095,262 A | 6/1978 | St. Clair | |
| 4,176,898 A | 12/1979 | Marechal | |
| 4,276,576 A | 6/1981 | Uman et al. | |
| 4,433,607 A | 2/1984 | Kemeny | |
| 4,719,530 A | 1/1988 | Berdanos | |
| 4,725,886 A | 2/1988 | Galumbeck et al. | |
| 4,752,854 A | 6/1988 | Lefort et al. | |
| 4,755,804 A | 7/1988 | Levati et al. | |
| 4,792,806 A | 12/1988 | Bent et al. | |
| 4,914,444 A | 4/1990 | Pifer et al. | |
| 4,916,539 A | 4/1990 | Galumbeck | |
| 5,083,042 A | 1/1992 | Merchant | |
| 5,087,885 A | 2/1992 | Bergstrom | |

(Continued)

FOREIGN PATENT DOCUMENTS

JP      04342991      11/1992

OTHER PUBLICATIONS

Markus, "Repeater Circuits", Modern Electronic Circuits Reference Manual, 1980, p. 867.

(Continued)

*Primary Examiner* — Jared J Fureman
*Assistant Examiner* — Justen Fauth
(74) *Attorney, Agent, or Firm* — Kilpatrick Townsend & Stockton LLP

(57) ABSTRACT

A universal system used to monitor external conditions, particularly including environmental conditions, to preemptively activate secondary power sources and isolate electric loads from a main power source such as an electric utility's power grid for the purpose of protecting the load from dangerous power conditions brought about by the external condition. The system includes a universal control module capable of communicating with a variety of external stimuli sensors and automatic transfer switches that switch a load's power source from one source to another upon activation, which results in the isolation of the load from the main (or another) power source.

25 Claims, 2 Drawing Sheets

U.S. PATENT DOCUMENTS

| | | | |
|---|---|---|---|
| 5,140,419 A | | 8/1992 | Galumbeck et al. |
| 5,291,208 A | | 3/1994 | Young |
| 5,384,490 A | | 1/1995 | Swartz, Jr. |
| 5,453,899 A | | 9/1995 | Page |
| 5,521,603 A | | 5/1996 | Young |
| 5,541,501 A | | 7/1996 | Shaver et al. |
| 5,621,309 A | | 4/1997 | Feldman |
| 5,721,659 A | | 2/1998 | Young |
| 5,739,594 A | | 4/1998 | Sheppard et al. |
| 5,877,698 A | | 3/1999 | Kusnier et al. |
| 5,923,516 A | | 7/1999 | Young |
| 5,940,260 A | * | 8/1999 | Gelbien et al. .................. 361/62 |
| 5,959,815 A | | 9/1999 | Gilbert |
| 6,011,682 A | | 1/2000 | Storey |
| 6,038,118 A | | 3/2000 | Guerra |
| 6,049,143 A | | 4/2000 | Simpson et al. |
| 6,061,216 A | * | 5/2000 | Fuqua, III ......................... 361/1 |
| 6,104,582 A | | 8/2000 | Cannon et al. |
| 6,172,432 B1 | | 1/2001 | Schnackenberg et al. |
| 6,404,880 B1 | | 6/2002 | Stevens |
| 6,525,917 B1 | | 2/2003 | Arita et al. |
| 6,567,769 B2 | * | 5/2003 | Chang ........................... 702/188 |
| 6,674,625 B1 | | 1/2004 | Page |
| 6,731,484 B2 | | 5/2004 | Pebles et al. |
| 6,791,311 B2 | * | 9/2004 | Murphy et al. ................. 324/72 |
| 7,088,254 B2 | * | 8/2006 | Liebenow ..................... 340/601 |
| 7,256,977 B2 | | 8/2007 | Nakata |
| 7,259,481 B2 | | 8/2007 | Eaton et al. |
| 7,397,369 B2 | | 7/2008 | Zajac et al. |
| 7,417,843 B1 | | 8/2008 | Fowler |
| 7,418,314 B2 | | 8/2008 | Rasmussen |
| 7,468,566 B2 | * | 12/2008 | Serrano et al. .................. 307/68 |
| 7,535,129 B2 | * | 5/2009 | Phelps et al. .................. 307/115 |
| 7,567,060 B1 | * | 7/2009 | Atcitty et al. ................. 320/116 |
| 2003/0048005 A1 | | 3/2003 | Goldin et al. |
| 2005/0057878 A1 | | 3/2005 | Serrano et al. |
| 2006/0018069 A1 | | 1/2006 | Gull et al. |
| 2007/0126289 A1 | * | 6/2007 | Liu et al. ....................... 307/119 |
| 2008/0013243 A1 | | 1/2008 | Gammel et al. |
| 2008/0055797 A1 | | 3/2008 | Wardzala |
| 2008/0077336 A1 | | 3/2008 | Fernandes |
| 2008/0179958 A1 | | 7/2008 | Lathrop et al. |
| 2008/0231111 A1 | | 9/2008 | Hazani et al. |

OTHER PUBLICATIONS

Plumer, "We Need Better Lightning Protection", Fire Journal, Jan. 1987, pp. 41-45, 73.

Hasbrouck, "Lightning-Understanding It and Protecting Systems From Its Effects", Lawrence Livermore National Laboratory, 1990, pp. 601-638.

Shannon, "Watch Out for Summer Lightning", Reader's Digest, Aug. 1991, pp. 11, 14.

Seneca Goodman Ozark Telephone Company Case Study, http://www.alsetcorp.com, 2010.

Embarq Case Study, http://www.alsetcorp.com, 2010.

At&t Case Study, http://www.alsetcorp.com, 2010.

Alltel Case Study, http://www.alsetcorp.com, 2010.

* cited by examiner

UNIVERSAL SYSTEM FOR CONTROLLING AUTOMATED TRANSFER SWITCHES IN RESPONSE TO EXTERNAL STIMULI

CROSS REFERENCE TO RELATED APPLICATIONS

This application claims the priority of U.S. Provisional Application Ser. No. 60/997,535, entitled "System for Controlling Automated Transfer Switches in Response to External Stimuli," filed Oct. 4, 2007, the entire contents of which are hereby incorporated by this reference.

FIELD OF THE INVENTION

Embodiments of this invention generally relate to systems used to monitor external conditions, particularly including environmental conditions, and control the activation of isolated secondary power sources, such as generators.

BACKGROUND OF THE INVENTION

Every year environmental conditions cause billions of dollars of damage to valuable electronic and electrical gear and data. Lightning strikes, high winds, earthquakes, and other environmental conditions can cause unstable and dangerous power line conditions including high voltage surges, sags, and power loss in power grids, which endanger downstream mission critical systems and other sensitive electrical and electronic gear and data. Since many electronic and electrical devices are highly sensitive, these voltage vagaries can have damaging effects on the devices connected to power grids. Various surge protection devices are available that attempt to protect electronic equipment from electrical surges and other undesirable electrical phenomenon that result from destructive environmental conditions.

However, these surge protection devices are unreliable. Most surge protection devices leave a conductive path in place, eliminating their ability to deal with large surges. Many other protection devices use sacrificial components, which creates the possibility of inopportune power interruptions. The preferred way to protect critical electrical and electronic systems is to electrically isolate them. Devices that will automatically isolate circuits in response to lightning threats been have devised. For example, U.S. Pat. No. 6,674,625, entitled "Lightning Protection Systems," was designed to prevent high voltage charge from crossing its insulative barrier.

While lightning is a major threat to electronic and electrical gear and systems, it is by no means the only threat to reliable line power. Any of several environmental conditions can greatly affect the quality of line power. For example, ice storms create havoc by weighing down the power lines and causing branches and trees to fall onto the lines. High winds and seismic activity can cause power lines to fall, or to swing into contact with adjacent lines creating dangerous power conditions. Additionally, flooding and temperature extremes can also greatly affect power quality. As such, there are devices that monitor for these types and other similar types of conditions that can initiate the isolation of electrical or electronic devices.

While these devices do provide some protection, they come with several drawbacks. First, the protection devices protect individual electronic and electrical devices. If there are multiple electronic and electrical devices spread throughout a home or office that require protection, several protection devices are needed. Therefore, each protection device requires a specific connection to the electric or electronic device. Second, although there are several monitoring devices for various conditions, each device can only monitor one condition. Thus, several different devices must be used in order to provide protection from different environmental conditions. As such, connecting multiple devices can be an arduous and expensive task. As such, there is a need to efficiently and effectively isolate electric loads.

In addition to causing power surges that can damage valuable electronic and electrical equipment, environmental conditions can lead to a loss of power. Secondary power sources, such as generators, can be used to provide power in times when the power utility's electrical grid system has failed as a result of these environmental causes. Many secondary power sources include a transfer switch which allows switching from a primary power source, like a utility power grid, to a secondary or tertiary power source, such as a generator. These transfer switches may be manual or automatic, or a combination of both. Automatic transfer switches (ATS) can monitor incoming utility power and, upon sensing an interruption, activate the secondary power source and switch to it. However, there is often a delay before the secondary power source is activated. This is particularly the case when using a gasoline or diesel generator, which may take 10 seconds or more to bring the auxiliary power online.

This loss of power, while temporary, can have a tremendous impact. For example, may types of manufacturing deal with molten materials such as metals, glass, ceramics, PVC, or fiber optic material. The loss of power for these processes permits the material to cool and/or harden within the production facility, which ruins the material batch and frequently damages the manufacturing equipment. Hospitals are another area where a temporary loss of power can lead to disastrous results, including the loss of life. This concern is so great that many hospitals employ individuals to watch for storms or other environmental conditions that could lead to power failure and bring auxiliary power sources online before the loss of power occurs in order to prevent any interruptions of power.

To combat this problem, a wide variety of processes and devices have been utilized to activate and deactivate ATS-based electrical power systems to prevent the loss of power. For example, and as discussed above, manual on-site means have been employed to activate ATS's. Localized lightning detectors and lightning detection networks have been used to activate ATS-based electrical power systems as well. However, in each case, the sensing devices and/or their interface connections to the ATS must be custom-designed for the specific type of ATS system. If more threat-monitoring devices are desired, the user must initiate another custom-designed system. The task of customizing the sensor devices and their connections is cumbersome and expensive, especially when upgrading their electrical power systems as new generations of ATS systems appear.

Given the problems discussed above, there is a need for a device that is compatible with a broad range of ATS and other switching systems. Additionally, such a device should be able to communicate with a broad range of sensor devices that provide protection from a wide variety of conditions that threaten the integrity and/or quality of an electrical power supply. Also, the device should provide a means of initiating a preemptive secondary power source to eliminate any loss of power, as well as isolating loads from possible power surges. The device should provide a means of sensing when the threat condition has passed and reliable utility line power has been restored, and automatically transferring the loads back to utility line power.

SUMMARY OF THE INVENTION

Embodiments of this invention provide a universal system used to monitor external conditions, particularly including environmental conditions, to activate secondary power sources and isolating electric loads through the connection to a switching device, such as an ATS, from a main power source such as an electric utility's power grid. The system includes a universal control module capable of easily connecting to and communicating with a variety of ATS's, as well as other switch-controlling devices. The universal control module includes a controller that generates, sends, and receives various control signals. The universal control module also communicates with a variety of sensors that measure for potential threats to an electrical system. These threats include environmental conditions, such as lightning strikes, high winds, high water levels, seismic activity, ice, snow, extreme temperatures, as well as certain localized equipment conditions, including power quality, voltage, excessive vibration, localized temperature build up, and current levels. The universal control module also includes a transformer that converts power outputs of a variety of ATS's in order to power the universal control module. Additionally, the universal control module may communicate with other devices, such as alarms, telephones, computers, networks, and Supervisory Control and Data Acquisition (SCADA) systems.

When a threatening condition is sensed, a sensor sends a control signal to the controller of the universal control module. The controller generates and sends a switching signal to the ATS, initiating the secondary power source. Once power from the secondary power source is established, the ATS switches the electrical connection from the main source to the secondary source, isolating the electrical load from the main power source, which otherwise could deliver damaging voltages caused by the threatening condition. This action creates an additional benefit by preemptively establishing the secondary power prior to the possibility of a power loss due to the threatening conditions.

DETAILED DESCRIPTION OF THE INVENTION

Embodiments of this invention provide a system with a universal control device that can communicate with a wide range of ATS systems. The universal control device provides a means to control the functionality of the ATS system through the monitoring of a wide range of environmental threats. Additionally, the universal control device provides a means, through the ATS system, to protect electrical and electronic equipment, and other electrical loads, from power surges by isolating the load from electric utility power grids during environmental and system threats.

Figure 1:
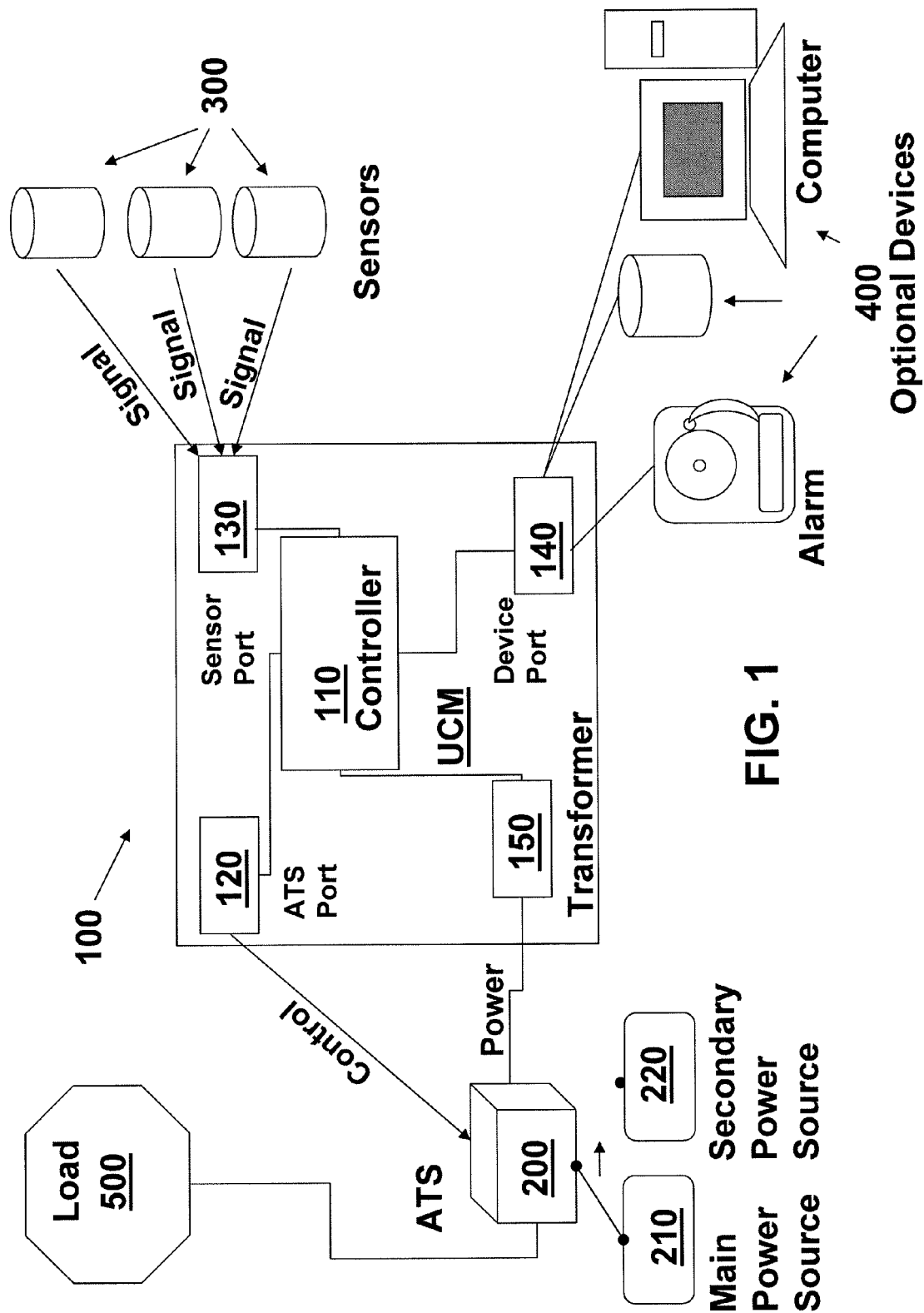
FIG. 1 is a schematic view of a universal system for controlling automated transfer switches according to one embodiment of this invention.
Figure 2:
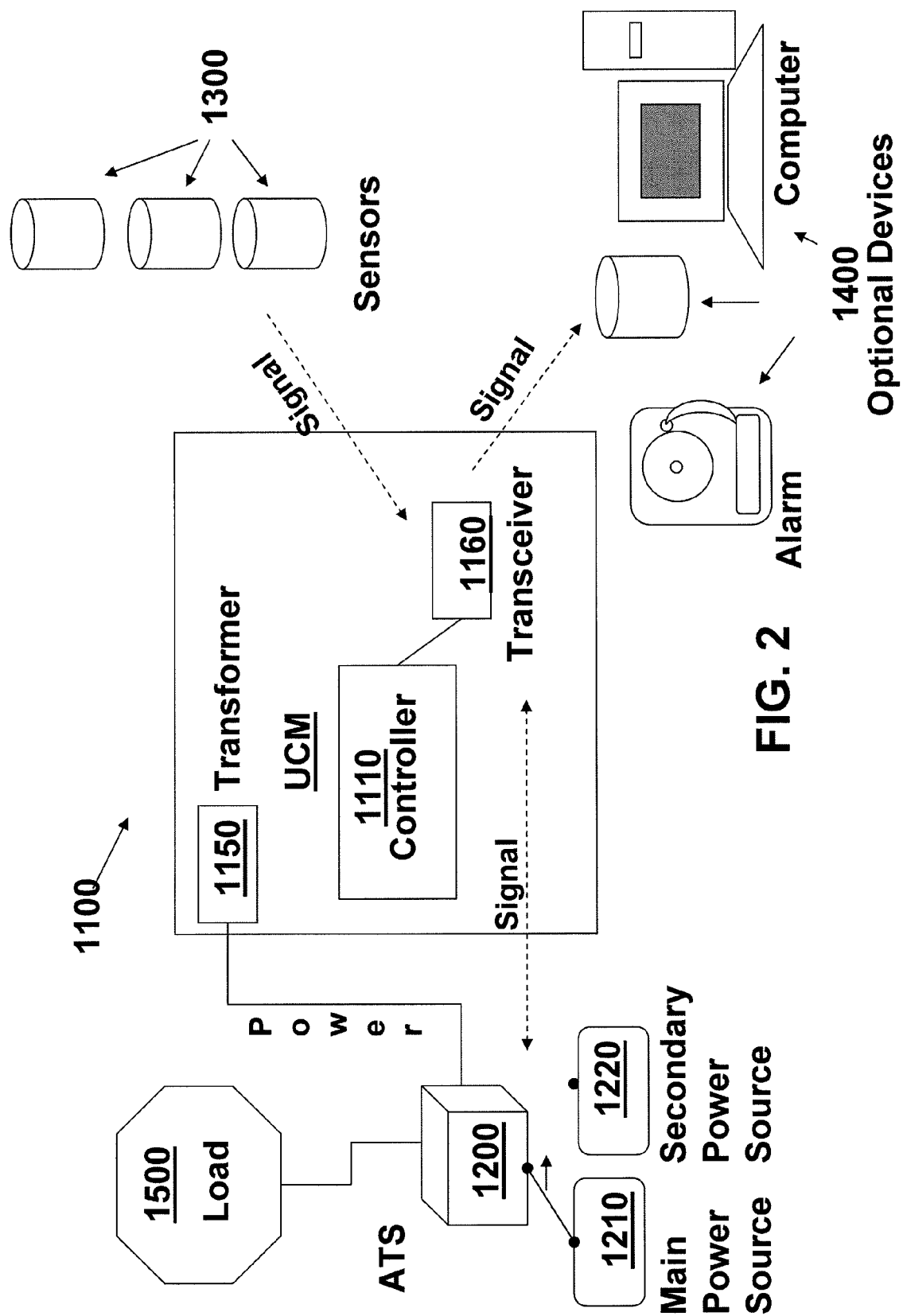
FIG. 2 is a schematic view of a universal system for controlling automated transfer switches according to another embodiment of this invention.

The universal control module (UCM) 100 of FIG. 1 is designed to work with a number of different ATS systems 200. These ATS systems 200 may be associated with multiple power sources 210 and 220 or other systems where electrical switching may occur. The UCM 100 communicates with external or internal sensors 300 through wired means (ports 130) or wireless communication means (1160 as shown in FIG. 2) to monitor environmental, and mechanical, external conditions. The UCM 100 determines whether or not to activate the ATS system 200 to switch to from the main power source 210, such as a utility's power grid, to an alternative power source 220 based upon what the sensors report. The sensors 300 send signals and data to the UCM's controller 110 through the sensor ports 130. Upon receiving the signals and data, the controller 110 then can generate a signal to activate the ATS system 200 through the ATS port 120. By activating the ATS system 200 and switching the power source from the main power source 210 to a secondary power source 220, the electric load 500 is isolated from the power grid 210 and protected from power surges. Additionally, the controller 110 can generate additional signals to activate various devices 400, as well as send data to these devices, connected through the device ports 140 or through wireless communication means 1160 (as shown in FIG. 2). An electrical transformer 150 allows the UCM 100 to run off voltage generated by the ATS system 200. Each component and its role in protecting the electrical systems will be discussed in further detail below.

The UCM 100 may be a single self-contained device that can be installed or incorporated within the ATS system's housing. The UCM 100 can also be mounted adjacent to or on the outside of the ATS housing with various mounting means. In other embodiments, the UCM may be a modular device having a controller module, a transceiver module, and various other functional modules that can be connected to the controller module.

The UCM is powered by the power supply of the ATS. However, the voltage supplied can vary from one ATS to another. Therefore, the UCM 100, as shown in FIG. 1, can include a transformer 150 that can convert a wide range of voltages into the voltage required to run the UCM 100, allowing the UCM 100 to be used with a wide range of ATS's. ATS systems 200 typically produce direct current. Therefore, herein "transformers" means that the transformer 150 can be an inverter or any other device that converts an available power input into a desired power output. Also, the transformer 150 could be a conventional alternating current transformer that steps up or steps down an alternating current voltage from the ATS 200. In addition to drawing power from the ATS 200, the UCM 100 is capable of being powered by direct line voltage or from independent low-voltage battery systems and fuel cells.

The UCM 100 is configured to communicate with a wide variety of sensors and warning systems. The sensors 300 can measure a variety of environmental conditions, such as, but not limited to, dangerous atmospheric conditions including: lightning strikes, high winds, blizzards, ice, snow, hail, and extreme temperatures; seismic activity resulting from earthquakes, rising water levels, and various other conditions that can lead to a disruption of an electric utility's power grid. Many environmental sensors are already commercially available. For example, Vaisala, Outdoors Technologies, and Skyscan provide lightning sensors, Oregon Scientific and Weather Hawk provide anemometers, and Steiner Industries provides seismometers. Sensors that monitor certain localized equipment conditions, such as, but not limited to, temperature levels of transformers and other critical utility components, power quality, electrical surges, high voltage levels, excessive vibration, and rolling blackouts, may be connected as well. Additionally, the UCM 100 may be connected to various warning systems. For example, the UCM 100 may receive encoded broadcasts from the National Weather Services Specific Area Message Encoded (SAME) broadcasts, or similar encoded broadcasts, to provide the UCM and the user with specific 100 weather information.

The sensors 300 continuously monitor their associated condition, collect data, and generate a control signal to send to the UCM 100 through the sensor ports 130 when a condition's threshold is reached. For example, if a sensor measuring wind speed senses air moving at a particular speed threshold, the sensor 300 will generate a control signal that notifies the UCM 100 that the threshold level has been detected. In some embodiments, these threshold points may be predetermined. In other embodiments, the threshold points may be user-selectable set points allowing a user to determine what constitutes a threat condition for their particular ATS system and to change the threshold point from time to time.

The sensors 300 can also generate a control signal to alert the UCM 100 when a threshold condition has subsided, indicating that the threat has past. However, even when the condition that created the threat has passed, there is no guarantee that quality power from the main source 210 is present. Therefore the UCM 100 may utilize sensors monitoring the main power source 210 to determine if the ATS 200 should be switched back to the main power source 210. In some instances, the ATS 200 may monitor the main power source 210 and communicate the results to the UCM 100. In other instances, separate sensors may monitor the main power source. However, it may be desirable to require that the ATS 200 be re-set manually. In addition to control signals, the sensors 300 may produce other transmittable data for the use of the UCM 100. This data can include current monitoring levels and can be sent independently of any control signals. In some embodiments, the sensors 300 may only monitor and report the existing conditions. In these embodiments, the UCM 100 compares the data to stored threshold points.

The UCM 100 can communicate with the sensors 300 in a variety of ways. As shown in FIG. 1, the UCM 100 includes a number of sensor ports 130. These sensor ports 130 allow a number of different sensors 300 to have a line connection with the UCM 100. These connections may include, but are not limited to, electrical wire, cable, and fiber-optics. In other embodiments, such as the one shown in FIG. 2, the UCM 1100 includes a radio frequency, infrared, microwave, or other transceiver 1160, allowing the sensors 1300 to communicate wirelessly with the UCM 1100. The transceiver 1160 may be tunable or fixed-frequency. The transceiver 1160 may be internally incorporated within the UCM 1100 or be externally located and connected to the UCM 1100 through a port or other connection. The transceiver 1160 may be able to receive and transmit pager, wireless internet, cellular, mesh network, or other wireless signals as appropriate to the sensors 1300. In some other embodiments, a variety of sensors may be integrated within the UCM.

The data and signals received by the UCM 100 from the sensors 300 is communicated to the controller 110. The controller 110 may be a programmable interface controller (PIC). However, in other embodiments, the controller 110 may be other devices, such as, but not limited to, small computers. The controller 110 interprets the signals and data to generate additional control signals. Upon receiving a control signal indicating that a threshold level has been reached, the controller 110 generates and sends a switching signal to activate the ATS 200. The switching signal may be transmitted through the ATS port 120, as shown in FIG. 1, or a transceiver 1160, as shown in FIG. 2. In response to the received control signal, the switching signal generated by the controller 110 causes the ATS 200 to either switch from the main power source 210 to the secondary power source 220 or vice versa.

In addition to initiating switching signals, the controller 110 can generate other signals to initiate other actions and processes based upon the functionality desired by the user. As shown in FIG. 1, the UMC 100 has device ports 140 to which numerous devices 400 can be connected. For example, the controller 110 can activate an alarm upon receiving the control signal from a sensor 300. Additionally, the controller 110 can activate a connected computer to create a log of events and data received from the sensors 300, as well as reporting the status of the sensors 300. The data logging option can be of great importance, allowing a company to correlate environmental threat data collected by the sensors with actual damage encountered to power systems to help them make more informed decisions in the future. Other optional devices include, but are not limited to, telephones, networks, and SCADA systems. In other embodiments, the tunable transceiver 1160 may communicate wirelessly to additional devices 1400.

The UCM 100, through the use of the ATS 200, also provides a way to isolate a load from power surges. An ATS acts as an intermediary between power sources and electrical loads. As shown in FIG. 1, the ATS 200 is connected to a UCM 100, a main power source 210, a secondary power source 220, and a load 500. At any given time, the ATS 200 is only connected to either the main power source 210 or the secondary power source 220. By connecting the load 500 to the ATS 200, the load 500 does not have a permanent direct connection to the main power source 210. When a sensor 300 senses a threatening condition that could result in a power surge from the main power source 210, the ATS 200 is switched to a secondary source 220, terminating the connection of the ATS 200 to the main power source 210. Since the load 500 is connected to the ATS 200, the connection between the load 500 and the main power source 210 is terminated as well, preventing any electrical surge damage from occurring to the load 500. The separation is critical in protecting the load 500 from a surge. Voltages that are produced by surges can easily arc across minimal distances. The physical separation here between the loads 500 and the main power source 210 is great enough to minimize the chances of the surge arcing and affecting the load.

The UCM 100 is not limited to use with ATS systems associated with a secondary power source. The UCM 100 may be used directly by a power utility at its substation relays. Substation relays monitor for fault conditions occurring on the branch circuits to which they are connected. When a power line has been severed, or shorted out, a fault will be registered. For safety reasons, the substation relay will allow the fuse associated with that branch circuit to blow, interrupting power to that circuit. However, storms often cause temporary fault conditions. For instance, storms can cause adjacent lines to come in contact with one another briefly, or can cause tree limbs to fall on power lines. Both of these situations, however, can be self-correcting given enough time: the lines may disconnect, and the limb may fall or burn off the line. In such cases, allowing the fuse to blow is extremely wasteful, requiring an expensive repair, and inconveniences many power users. In response to these possibilities, the substation relays may be switched to a mode that allows for a period of self correction before blowing the fuse. This mode is often called storm mode, initiated when there is a threat of a storm. Most utilities require a person, either at the substation or related control system, to switch the relays into this storm mode. The UCM 100 can take the place of the individual to activate the substation, preventing human error and saving labor.

The foregoing is provided for purposes of illustrating, explaining, and describing embodiments of the present invention. As the alternatives discussed above show, further modifications and adaptations to these embodiments may be made without departing from the scope or spirit of the invention or the scope of the following claims.

What is claimed is:

1. A system for controlling the selection of an electrical power source between a main power source and a secondary power source, comprising:
    (a) at least one sensor configured to generate data upon sensing a selected threshold of an external event, wherein the external event is external to the main power source and the secondary power source, and wherein the external event is remote from the system; and
    (b) a universal control module comprising a controller configured to receive data from the at least one sensor and generate first activation signals, the first activation signals comprising a first switching signal for controlling a first type of automated transfer switch, the first type of automated transfer switch comprising electrical connections configured to
        (i) receive switching signals;
        (ii) activate the secondary power source; and
        (iii) switch electrical connections from the main power source to the secondary power source and from the secondary power source to the main power source;
    wherein the universal control module can be connected to at least one additional sensor and is configured to receive data from the at least one additional sensor, and wherein the universal control module is configured to communicate with a plurality of different types of automated transfer switches.

2. The system of claim 1, wherein the universal control module further comprises a transformer that converts voltage from the automated transfer switch into voltage to operate the universal control module.

3. The system of claim 2, wherein the transformer is configured to convert multiple voltages from different automated transfer switches.

4. The system of claim 1, wherein the at least one sensor is configured to generate a control signal upon sensing the selected threshold and the controller receives the control signal from the at least one sensor to generate activation signals.

5. The system of claim 1, wherein the controller is configured to generate at least one control signal to operate at least one optional device.

6. The system of claim 5, wherein the optional device comprises an alarm, telephone, computer, network, or SCADA systems.

7. The system of claim 1 further comprising a main power source sensor configured to generate main power source monitoring data, wherein the controller is configured to receive data from the main power system sensor and to determine the quality of power available from the main power source before generating a second switching signal to activate the automated transfer switch to switch from the secondary power source to the main power source.

8. The system of claim 1, wherein the controller comprises a programmable interface controller.

9. The system of claim 1, wherein the system waits until power is established from the secondary power source before switching the electrical connections from the main power source to the secondary power source.

10. The system of claim 1, further comprising at least one second sensor for monitoring the secondary power source.

11. A system for controlling the selection of an electrical power source between a main power source and a secondary power source, comprising:
    (a) at least one sensor configured to collect data and generate a control signal upon sensing a selected threshold of an external event, wherein the external event is external to the main power source and the secondary power source, and wherein the external event is remote from the system;
    (b) an automated transfer switch comprising:
        (i) a power source;
        (ii) an electrical connection to an electrical load;
        (iii) an electrical connection to the main power source; and
        (iv) an electrical connection to the secondary power source,
    wherein the automated transfer switch is configured to receive switching signals, activate the secondary power source, and disengage the electrical connection to the main power source and engage the electrical connection to the secondary power source, isolating the load from the main power source; and
    (c) a universal control module comprising:
        (i) a programmable interface controller configured to receive control signals from the at least one sensor and generate activation signals, the activation signals comprising switching signals for controlling the automated transfer switch; and
        (ii) a transformer configured to convert a first voltage from the power source of the automated transfer switch to a second voltage for use by the universal control module;
    wherein the universal control module can be connected to at least one additional sensor and is configured to receive data from the at least one additional sensor, and wherein the universal control module is configured to communicate with a plurality of different types of automated transfer switches.

12. A universal control module for controlling the selection of an electrical power source between a main power source and a secondary power source, comprising:
    (a) at least one input configured for connection to at least one sensor measuring external stimuli and generating control signals, wherein the external stimuli is external to the main power source and the secondary power source, and wherein the external stimuli is remote from the universal control module;
    (b) a controller configured to receive control signals from the at least one sensor and generate activation signals; and
    (c) a transfer switch connection configured to facilitate communication between a transfer switch and the controller and to send activation signals to activate the transfer switch;
    wherein the universal control module can be connected to at least one additional sensor and is configured to receive data from the at least one additional sensor, and wherein the universal control module is configured to communicate with a plurality of different types of automated transfer switches.

13. The universal control module of claim 12, further comprising a transformer, wherein the transformer supplies power to the universal control module by converting a first voltage from the transfer switch to a second voltage useable by the universal control module.

14. The system of claim 13, wherein the transformer is configured to convert multiple voltages from different automated transfer switches.

15. The universal control module of claim 12, wherein at least one of the sensors is contained within the universal control module.

16. The universal control module of claim 12, further comprising a transceiver configured to send and receive wireless signals to communicate between the controller and at least one other device.

17. The universal control module of claim 12, wherein the at least one other device comprises the transfer switch and an auxiliary device.

18. The universal control module of claim 12, further comprising at least one port configured for communicating activation signals to auxiliary devices.

19. The universal control module of claim 12, wherein the controller further comprises a programmable interface controller.

20. The universal control module of claim 12, wherein the universal control module waits until power is established before sending the activation signals to activate the transfer switch.

21. The universal control module of claim 12, wherein the additional sensor is a sensor for monitoring the secondary power source.

22. A system for controlling the selection of an electrical power source between a main power source and a secondary power source, comprising:
   (a) at least one sensor configured to generate data upon sensing a selected threshold of an external event, wherein the external event is external to the main power source and the secondary power source, and wherein the external event is remote from the system;
   (b) at least one second sensor configured to generate data upon sensing a second event;
   (c) a universal control module comprising a controller configured to receive data from the at least one sensor and the at least one second sensor, and to generate first activation signals, the first activation signals comprising a first switching signal for controlling a first type of automated transfer switch, the first type of automated transfer switch comprising electrical connections configured to
      (i) receive switching signals;
      (ii) activate the secondary power source; and
      (iii) switch electrical connections from the main power source to the secondary power source and from the secondary power source to the main power source;
   wherein the universal control module can be connected to at least one additional sensor and is configured to receive data from the at least one additional sensor, and wherein the universal control module is configured to communicate with a plurality of different types of automated transfer switches.

23. The system of claim 22, wherein the universal control module waits until power is established before sending the activation signals to activate the transfer switch.

24. The system of claim 23, wherein the at least one second sensor is configured to sense localized equipment conditions.

25. The system of claim 22, further comprising at least one third sensor for monitoring the secondary power source.

* * * * *